US012475657B2

(12) United States Patent
Tinklepaugh et al.

(10) Patent No.: US 12,475,657 B2
(45) Date of Patent: Nov. 18, 2025

(54) SCHEDULING TIMED INTERCHANGE PROTOCOLS VIA AUGMENTED-REALITY (AR) SYSTEMS AND METHODS

(71) Applicant: Truist Bank, Charlotte, NC (US)

(72) Inventors: Micah Ryan Tinklepaugh, Charlotte, NC (US); Jahlisa Misenheimer, Concord, NC (US); Ryan David Hepford, Raleigh, NC (US); Daniel Jordan Schantz, Raleigh, NC (US); Reinaldo Gamaliel Rivera Colon, Raleigh, NC (US); Ali Rezajoo, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 97 days.

(21) Appl. No.: 17/937,284

(22) Filed: Sep. 30, 2022

(65) Prior Publication Data

US 2024/0112416 A1  Apr. 4, 2024

(51) Int. Cl.
*G09G 5/00* (2006.01)
*G06T 19/00* (2011.01)
*H04L 67/52* (2022.01)
*H04N 7/15* (2006.01)

(52) U.S. Cl.
CPC .......... *G06T 19/006* (2013.01); *H04L 67/52* (2022.05); *H04N 7/152* (2013.01)

(58) Field of Classification Search
CPC ........ G06T 19/006; G06T 19/00; G06T 7/74; G06T 7/94; G06T 11/00; G06T 2207/10012; G06T 2207/20021; G06F 3/011; G06F 3/012; G02B 27/017; G02B 1/041; G02B 2027/0178; H04L 67/52; H04N 7/152

USPC ........................................................ 345/633
See application file for complete search history.

(56) References Cited

U.S. PATENT DOCUMENTS

| | | |
|---|---|---|
| 10,515,401 B1 | 12/2019 | Unnikrishnan |
| 10,535,201 B1 | 1/2020 | Price |
| 11,386,622 B1 | 7/2022 | Obeyesekere |
| 2015/0109338 A1* | 4/2015 | McKinnon .......... G06F 16/9535 345/633 |
| 2016/0162982 A1 | 6/2016 | Calman |

(Continued)

*Primary Examiner* — Gordon G Liu
(74) *Attorney, Agent, or Firm* — Michael A. Springs, Esq.; Shumaker, Loop & Kendrick, LLP; Patrick B. Horne

(57) ABSTRACT

A system for scheduling a timed interchange protocol via an integrated augmented-reality presentation, includes a computing system having a processor, a memory device and a non-transitory storage device. The one or more processor executes computer-readable instructions. A network connection connects multiple user devices to the computing system, each of the multiple user devices having a known or determinable current location. Upon execution of the computer-readable instructions, the computing system performs steps including, for each user device of the multiple user devices, receiving geolocation data identifying the current location of the user device, and retrieving, from the at least one of a memory device and a non-transitory storage device, overlay content for display on the user device. The overlay content includes information about an accessible item (AI) in a non-transient position proximal to a current location of the user device. The overlay content is sent for display on the user device.

20 Claims, 12 Drawing Sheets

(56) References Cited

U.S. PATENT DOCUMENTS

| | | | |
|---|---|---|---|
| 2016/0191582 A1* | 6/2016 | Shivaram | H04L 65/61 |
| | | | 709/231 |
| 2016/0300392 A1* | 10/2016 | Jonczyk | G06T 19/003 |
| 2018/0108058 A1 | 4/2018 | Cotton | |
| 2020/0074546 A1 | 3/2020 | Coulter | |
| 2020/0302380 A1 | 9/2020 | Nyswonger | |
| 2021/0295047 A1 | 9/2021 | Furlan | |
| 2022/0084097 A1 | 3/2022 | Kalidindi | |
| 2022/0189124 A1 | 6/2022 | Senor | |
| 2022/0366426 A1 | 11/2022 | Tang | |
| 2023/0137068 A1* | 5/2023 | Li | G06F 16/9537 |
| | | | 707/741 |
| 2023/0377215 A1* | 11/2023 | Shin | G06V 10/56 |

\* cited by examiner

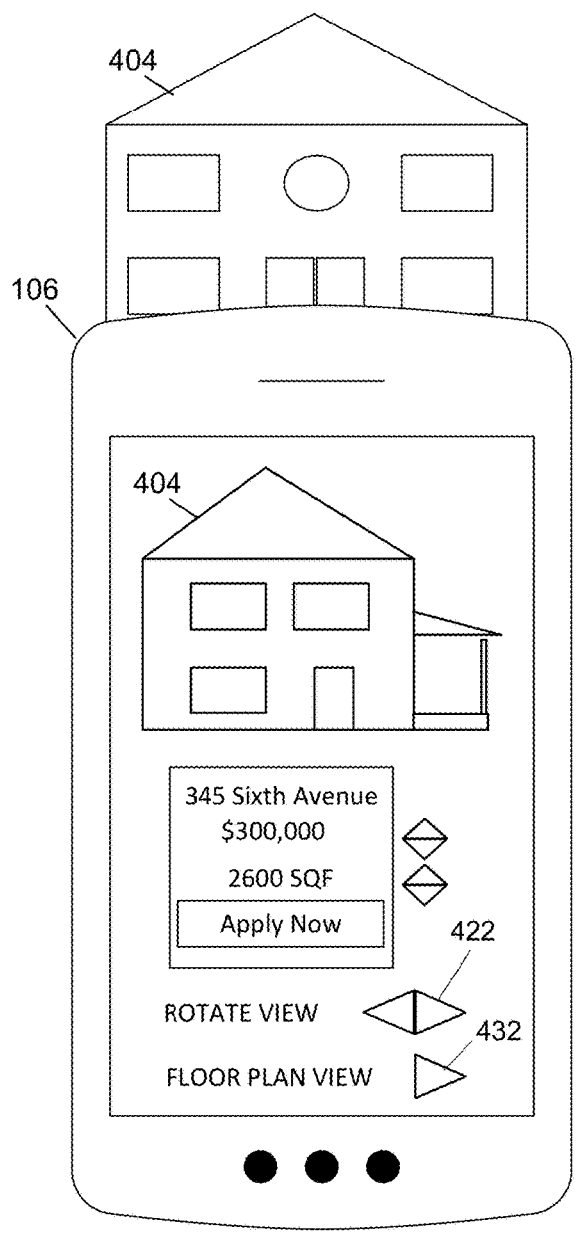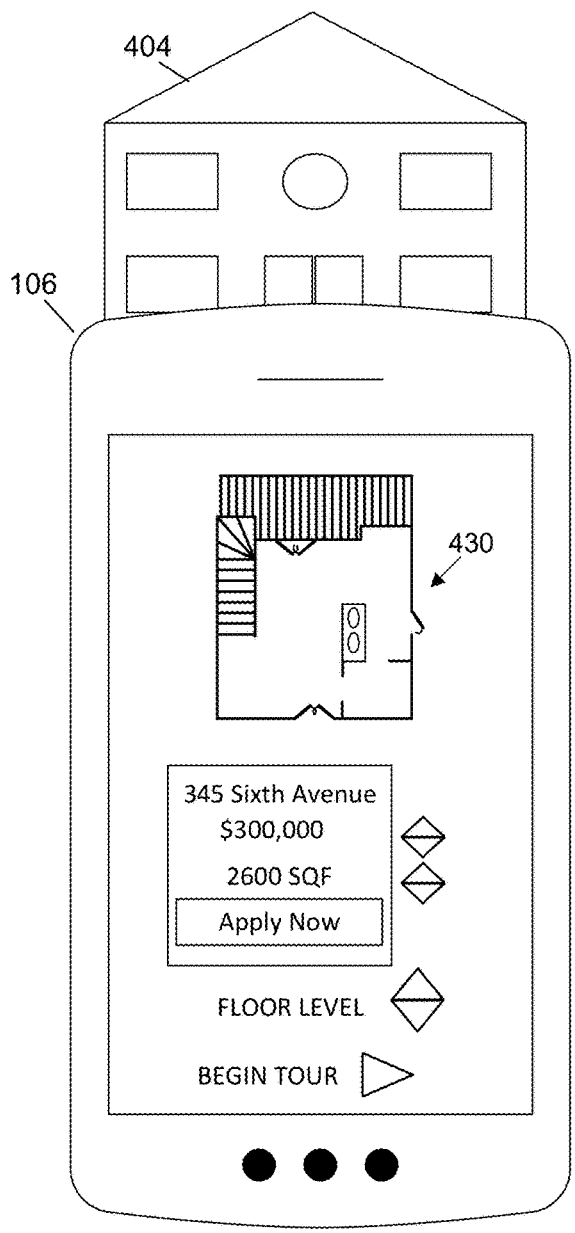
FIG. 5A  FIG. 5B

SCHEDULING TIMED INTERCHANGE PROTOCOLS VIA AUGMENTED-REALITY (AR) SYSTEMS AND METHODS

FIELD

This invention relates generally to the field of augmented reality (AR) presentations, and more particularly to their use across both mobile and home-based computing devices.

BACKGROUND

Interactions between existing clients and potential clients and providers of products and services are increasingly conducted online or via network connections, and increasingly, consumers expect to access information conveniently and intuitively using mobile devices. Purchase decisions, small and large, are being made in whole or in part using computers, including mobile phones. People browse for products and services on their laptop computers and on their phones.

Virtual reality (VR) and augmented reality (AR) experiences are familiar to and popular among gaming communities. As these technologies were being popularized, specialized equipment and advanced computing devices were required. Increasingly, typical consumers have mobile devices and home-based computer with sufficient computing power to implement VR and AR presentations.

Although such sufficient computing power is in the hands and homes of typical consumers, providers of services and products have not yet fully implemented VR and AR technology in marketing and purchase application processes.

Improved systems and methods are needed to implement the intuitive navigation and powerful information dissemination capabilities of VR and AR in marketing related activities and client intake.

BRIEF SUMMARY

Embodiments of the present invention address the above needs and/or achieve other advantages by providing apparatuses and methods that facilitate scheduling a timed interchange protocol via, at least in part, an integrated augmented-reality (AR) presentation.

In various embodiments, a system for scheduling a timed interchange protocol via, at least in part, an integrated augmented-reality (AR) presentation, includes a computing system including one or more processor and at least one of a memory device and a non-transitory storage device. The one or more processor executes computer-readable instructions. A network connection operatively connects multiple user devices to the computing system, each of the multiple user devices having a known or determinable current location. Upon execution of the computer-readable instructions, the computing system performs steps, for each user device of the multiple user devices. The steps, in various embodiments, include receiving geolocation data identifying the current location of the user device, and retrieving, from the at least one of a memory device and a non-transitory storage device, overlay content for display on the user device. The overlay content includes information about an accessible item (AI) in a non-transient position proximal to a current location of the user device. The overlay content is sent for display on the user device.

In some examples, sending the overlay content for display on the user device causes the user device to display the overlay content in an AR presentation.

In some examples, the computing system performs further steps including, for each user device of the multiple user devices, receiving positional data identifying at least one of: a current orientation of view of the user device; and a current orientation of view preferred by the user according to user actuation of one or more navigational button of the user device. Further steps may include sending updated overlay content for display on the user device, the updated overlay content including at least one of: content retrieved from the at least one of a memory device and a non-transitory storage device; and content generated based on data retrieved from the at least one of a memory device and a non-transitory storage device. Sending the updated overlay content for display on the user device may cause the user device to display the updated overlay content in an updated AR presentation.

The overlay content may include geometric data about the AI, renumeration data for acquisition of the AI, and a prompt to initiate an acquisition process.

In some examples, the user device displays one or more buttons for actuation by a user to access geometric data and location data about at least a second accessible item (AI), and renumeration data for acquisition of the second AI.

The acquisition process may include scheduling a timed interchange protocol.

The accessible item may include a real estate property, and scheduling a timed interchange protocol may include mortgaging the real estate property.

The user device may be a mobile device, and a user of the user device may be provided at least a partial tour of the real estate property by the AR presentation on the mobile device by user actuations of one or more navigational buttons of the user device, the AR presentation including display of real world items and the overlay content.

In at least one embodiment, a system is provided for scheduling a timed interchange protocol via, at least in part, an integrated augmented-reality (AR) presentation. The system comprising, in various embodiments, includes a computing system including one or more processor and at least one of a memory device and a non-transitory storage device. The one or more processor executes computer-readable instructions. A network connection operatively connects, to the computing system, multiple user devices all associated with a particular user, the multiple user devices including a user mobile device having a GPS determinable current location, and a user computing device. Upon execution of the computer-readable instructions, the computing system performs steps including, for the user mobile device: receiving geolocation data identifying the current location of the user mobile device; retrieving, from the at least one of a memory device and a non-transitory storage device, overlay content for display on the user mobile device, the overlay content comprising information on an accessible item (AI) in a non-transient position proximal to the current location of the user mobile device; sending the overlay content for display on the user mobile device thereby causing the user device to display the overlay content in an AR presentation; and sending, to at least one of the user mobile device and user computing device, a prompt to initiate an acquisition process.

The computing system may perform further steps including, for the user mobile device, receiving positional data identifying at least one of: a current orientation of view of the specific user mobile device; and a current orientation of view preferred by the user according to user actuation of one or more navigational button of the user mobile device. The further steps may include sending updated overlay content for display on the user mobile device, the updated overlay content comprising at least one of: content retrieved from the at least one of a memory device and a non-transitory storage device; and content generated based on data retrieved from the at least one of a memory device and a non-transitory storage device. Sending the updated overlay content for display on the user mobile device causes the user mobile device to display the updated overlay content in an updated AR presentation.

The overlay content may include geometric data about the AI, renumeration data for acquisition of the AI, and a prompt to initiate an acquisition process The user device may displays one or more buttons for actuation by a user to access geometric data and location data about at least a second accessible item (AI), and renumeration data for acquisition of the second AI.

In various examples, the acquisition process includes scheduling a timed interchange protocol, the AI includes a real estate property; and scheduling a timed interchange protocol includes mortgaging the real estate property.

A user of the user mobile device may be provided a partial tour of the real estate property by the AR presentation on the mobile device according to user actuations of one or more navigational buttons of the mobile device, the AR presentation including display of real world items and the overlay content.

In various embodiments, a method is provided for scheduling, by a computing system, a timed interchange protocol via at least in part an integrated augmented-reality (AR) presentation, the computing system including one or more processor, at least one of a memory device and a non-transitory storage device, and a network connection for operatively connecting multiple user devices to the computing system, each of the multiple user devices having a known or determinable current location. The one or more processor is configured to execute computer-readable instructions. The method includes, upon execution of the computer-readable instructions by the at least one processor, for each user device of the multiple user devices: receiving geolocation data identifying the current location of the user device; retrieving, from the at least one of a memory device and a non-transitory storage device, overlay content for display on the user device, the overlay content comprising information on an accessible item (AI) in a non-transient position proximal to current location of the user device; and sending the overlay content for display on the user device.

Sending the overlay content for display on the user device may cause the user device to display the overlay content in an AR presentation.

The computing system in these and other embodiments performs further method steps corresponding to the actions and function of the above summarily described systems. The above descriptions should be taken as cumulative, such that features expressly associated with some particular embodiments can be combined with other embodiments. Features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
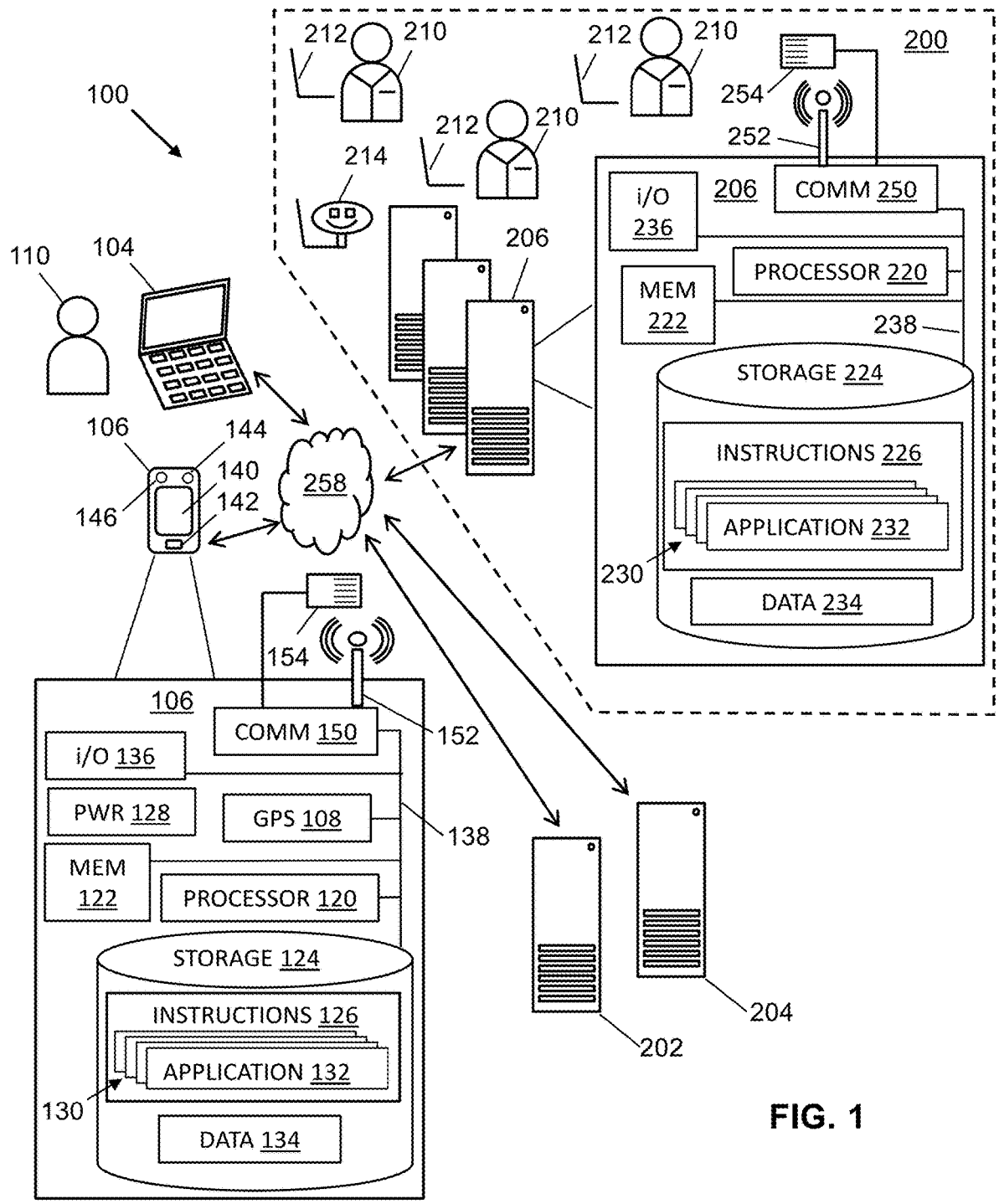

Having thus described embodiments of the invention in general terms, reference will now be made to the accompanying drawings, wherein:

FIG. 1 illustrates an enterprise system and environment thereof, according to at least one embodiment, for scheduling a timed interchange protocol via, at least in part, an integrated augmented-reality (AR) presentation.

Figure 2A:
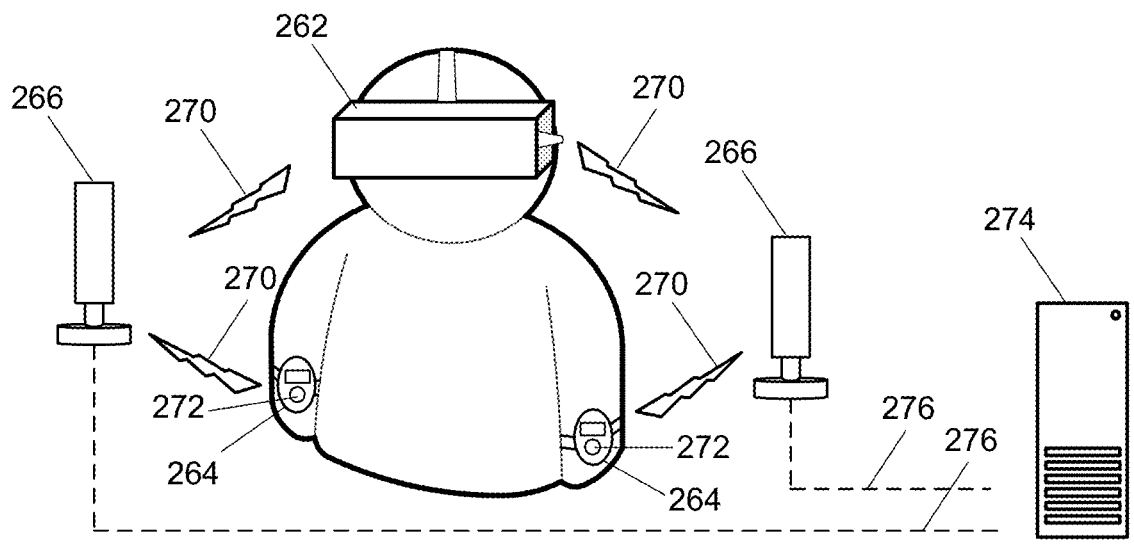

FIG. 2A illustrates equipment items, according to at least one embodiment, used in a virtual reality (VR) session.

Figure 2B:
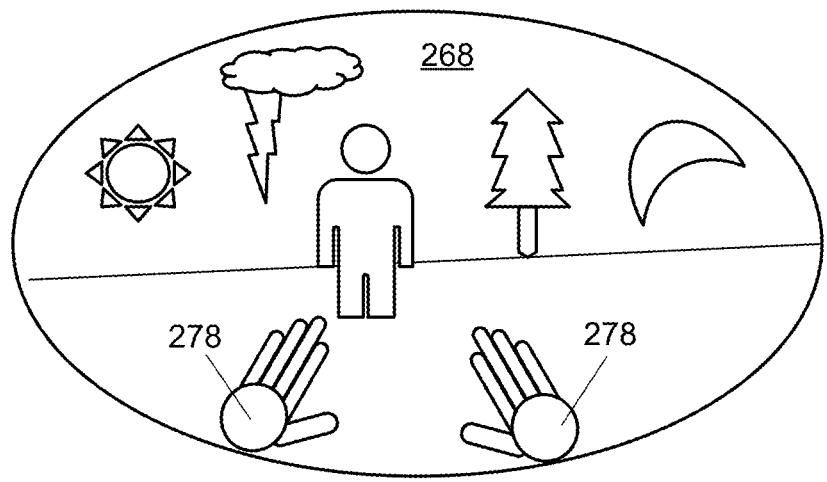

FIG. 2B shows a user view of a simulated environment in a VR session via a helmet or visor.

Figure 3A:
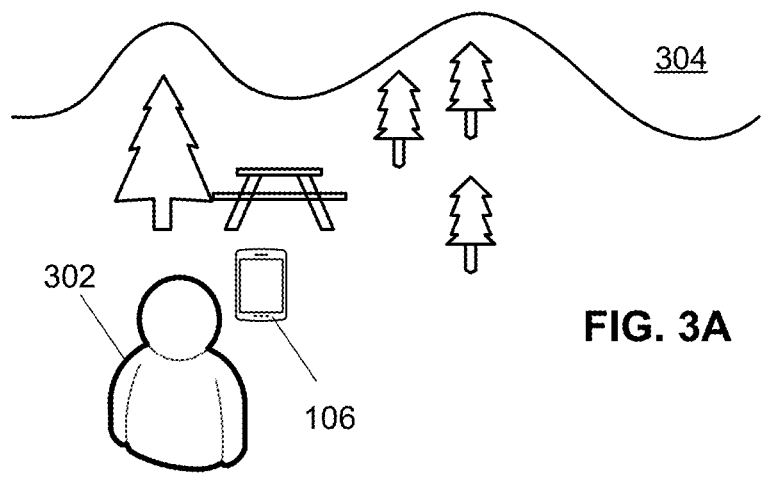

FIG. 3A shows an AR session in which a user views a background scene through an AR equipped mobile device.

Figure 3B:
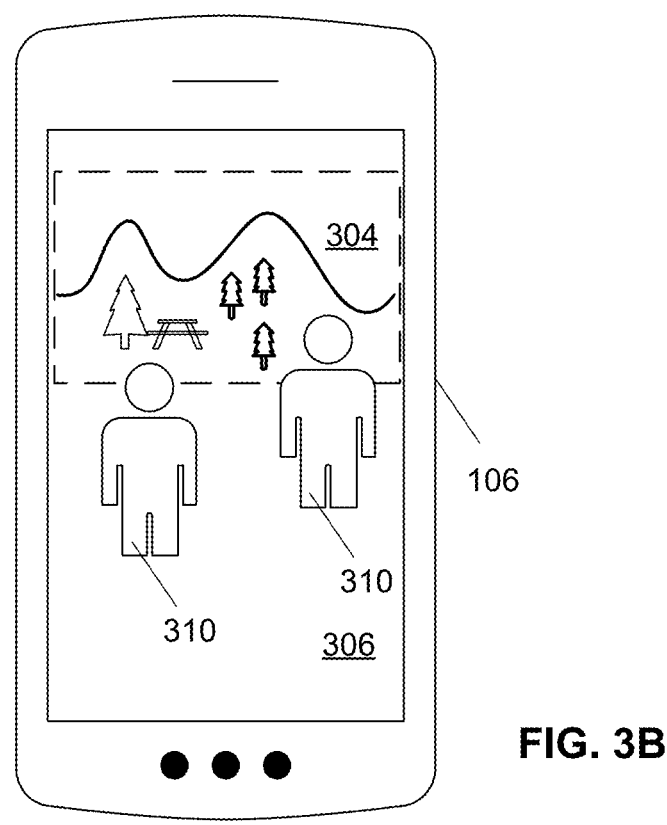

FIG. 3B shows an AR presentation on the mobile device corresponding to the AR session of FIG. 3A.

Figure 4A:
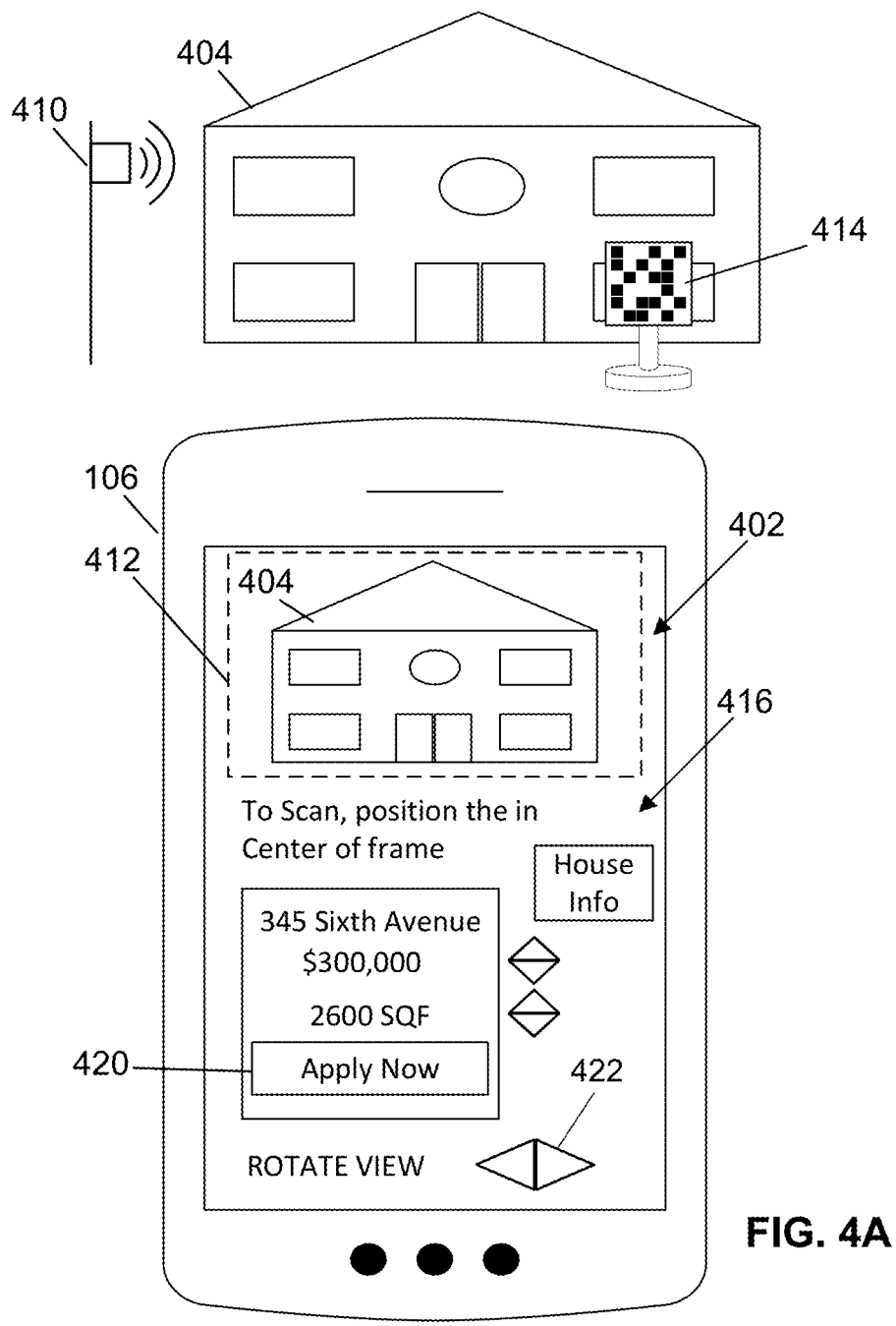

FIG. 4A shows an AR presentation on a user device, which displays an accessible real estate item and overlay content, according to at least one embodiment.

Figure 4B:
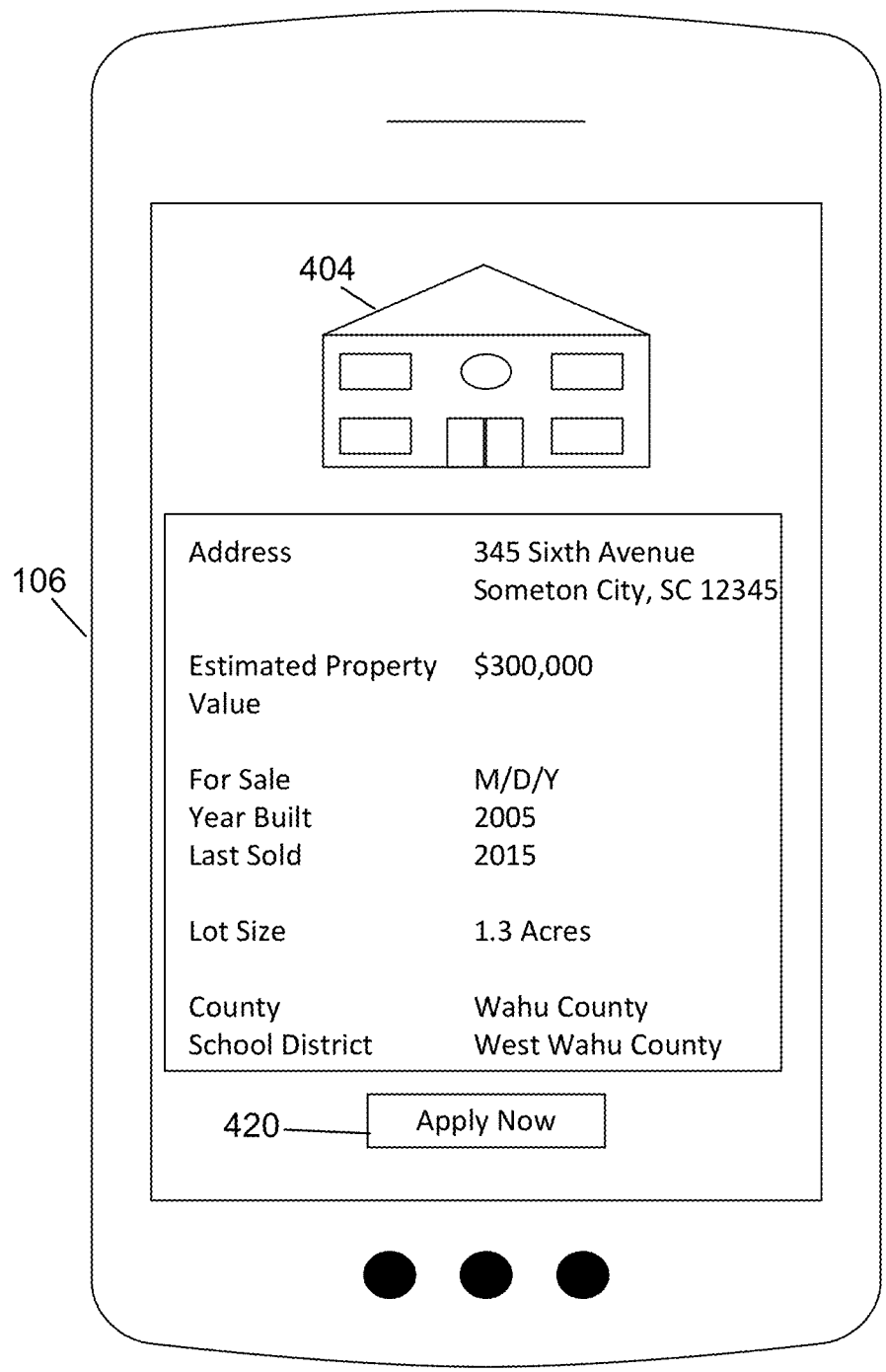

FIG. 4B shows a user device displaying geometric data about the accessible item of FIG. 4A, renumeration data for acquisition of the accessible item, and a prompt to initiate an acquisition process, according to at least one embodiment.

Figure 4C:
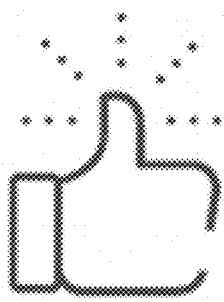

FIG. 4C shows a display window or area presenting results of a affordability analysis, which may be initiated for example at least in part by user actuation of the prompt in FIG. 4B.

Figure 4D:
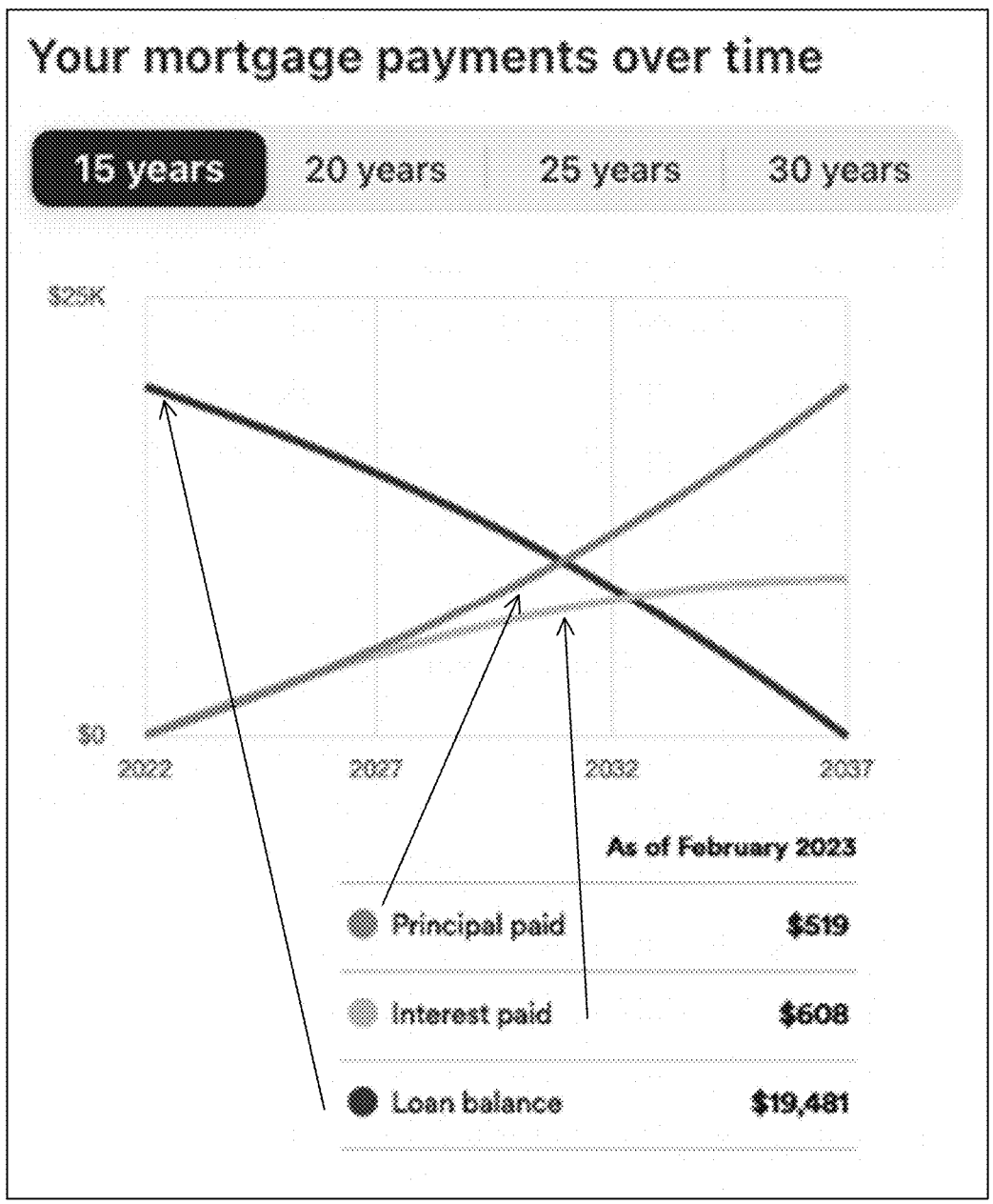

FIG. 4D shows a display window or area thereof presenting a graph of payment and balance data over time.

FIG. 5A shows a user device displaying geometric data about the accessible item of FIG. 4A and the item displayed in an orientation of view according to user actuation of one or more navigational button.

FIG. 5B shows a user device displaying a floor plan of a particular level of an accessible real estate item, according to at least one embodiment.

Figure 6:
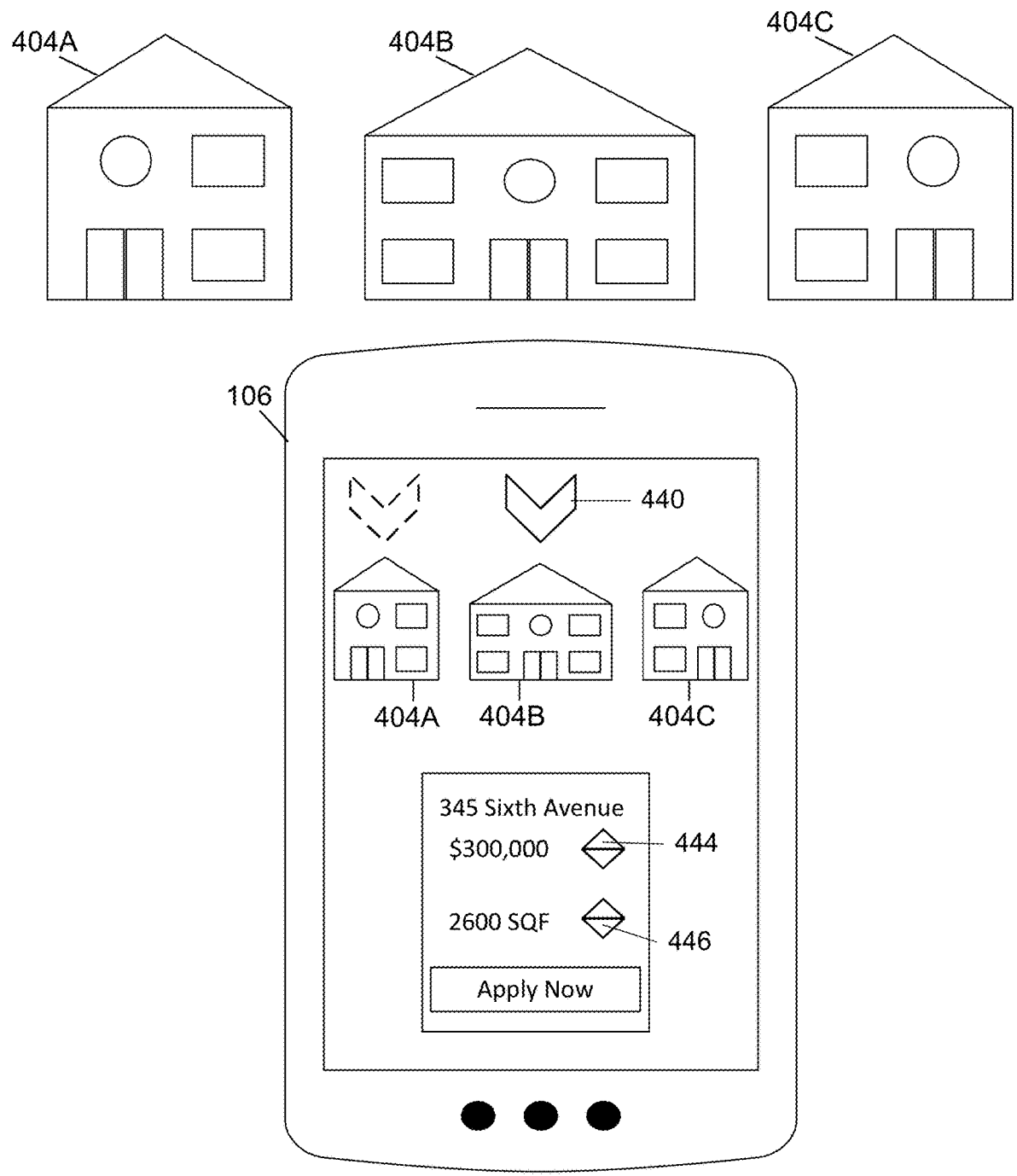

FIG. 6 shows an AR presentation in which a user device is configured to display respective location data, renumeration data, and geometry data for any one of multiple accessible items according to user controls or queries.

Figure 7:
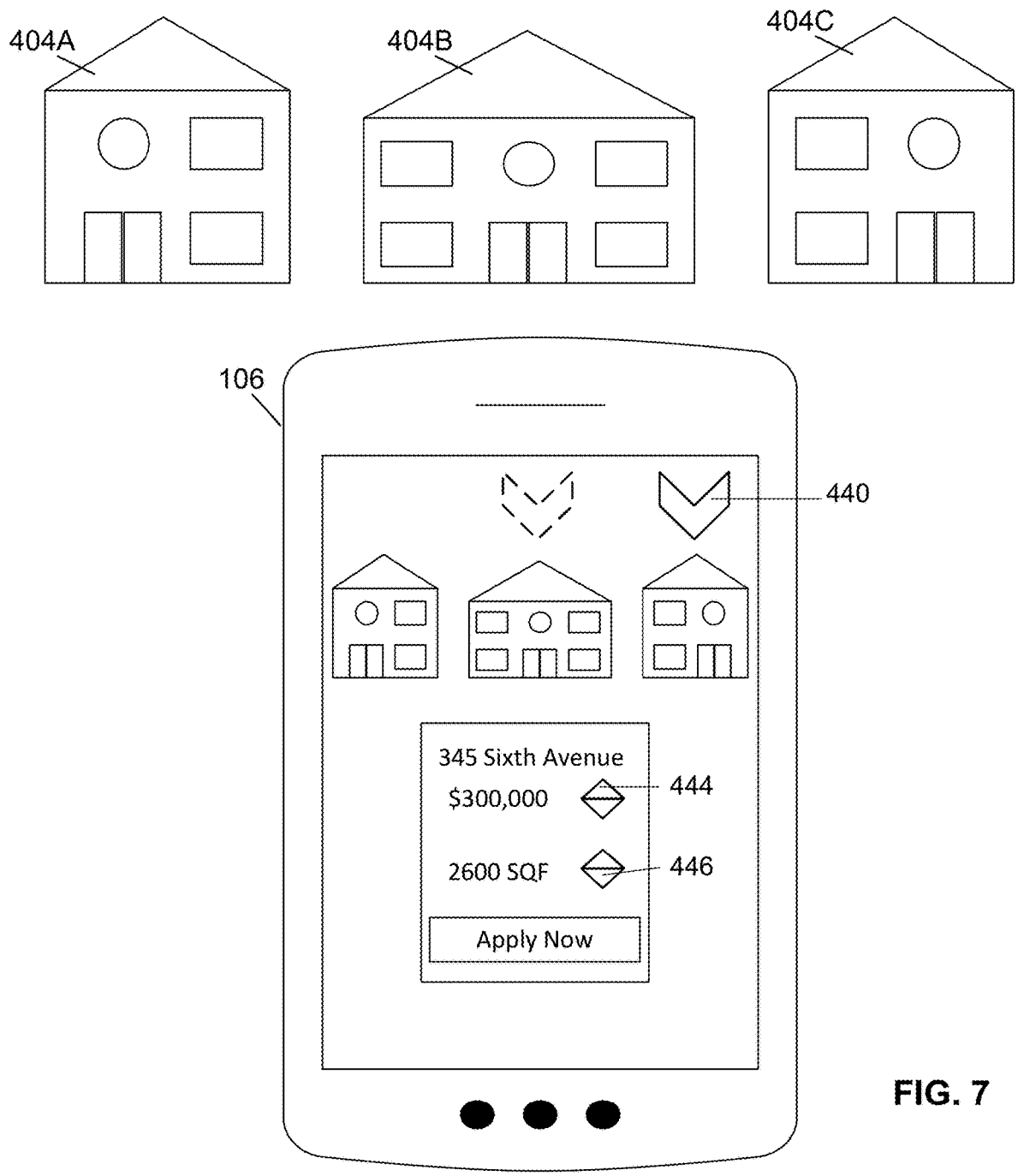

FIG. 7 further illustrates the user device of FIG. 6 utilized to access data for any one of several accessible items under user control.

Figure 8:
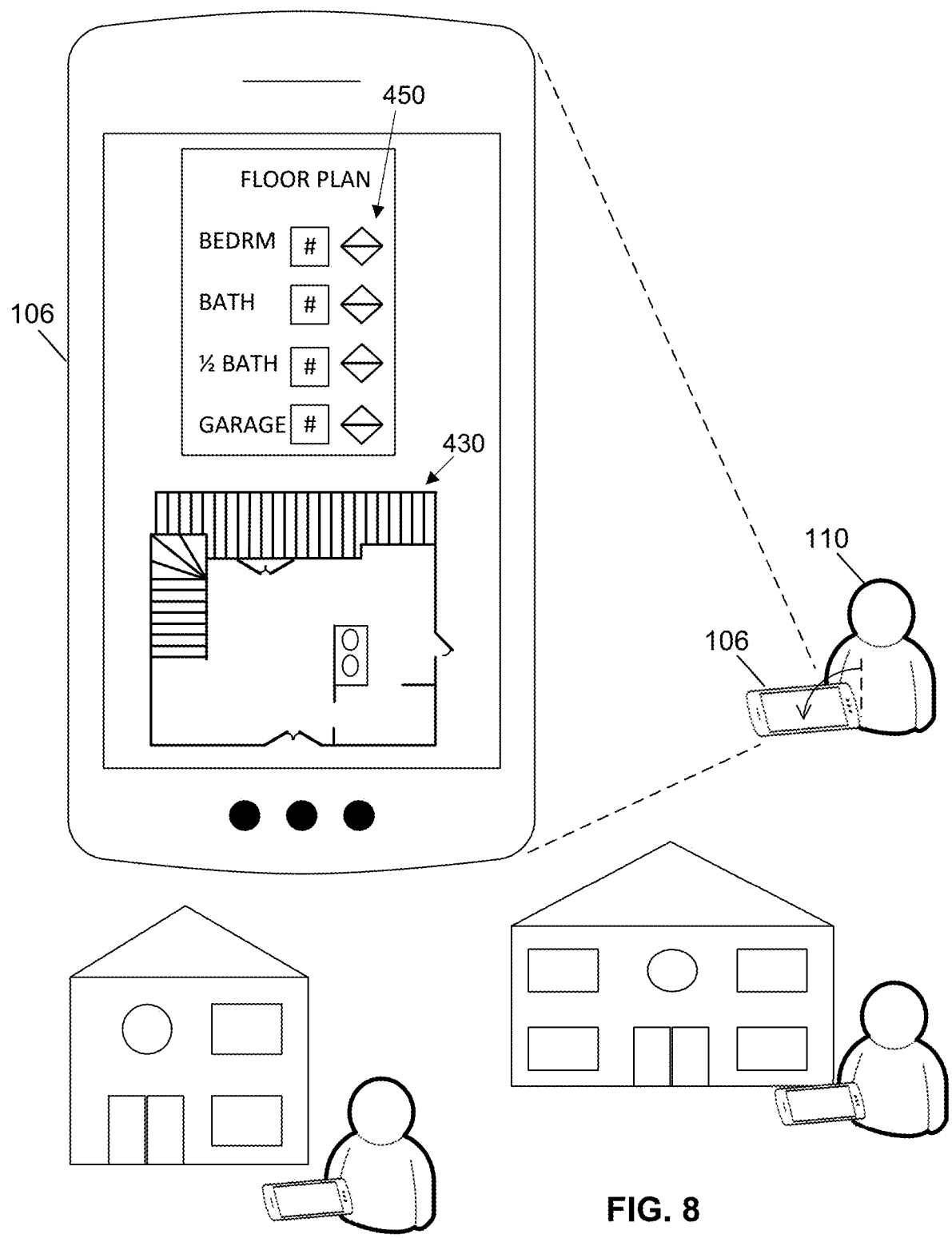

FIG. 8 shows a user device displaying accessible item data, represented as a real estate floor plan in at least one embodiment, and buttons for actuation by a user to access data for other accessible real estate items.

Figure 9:
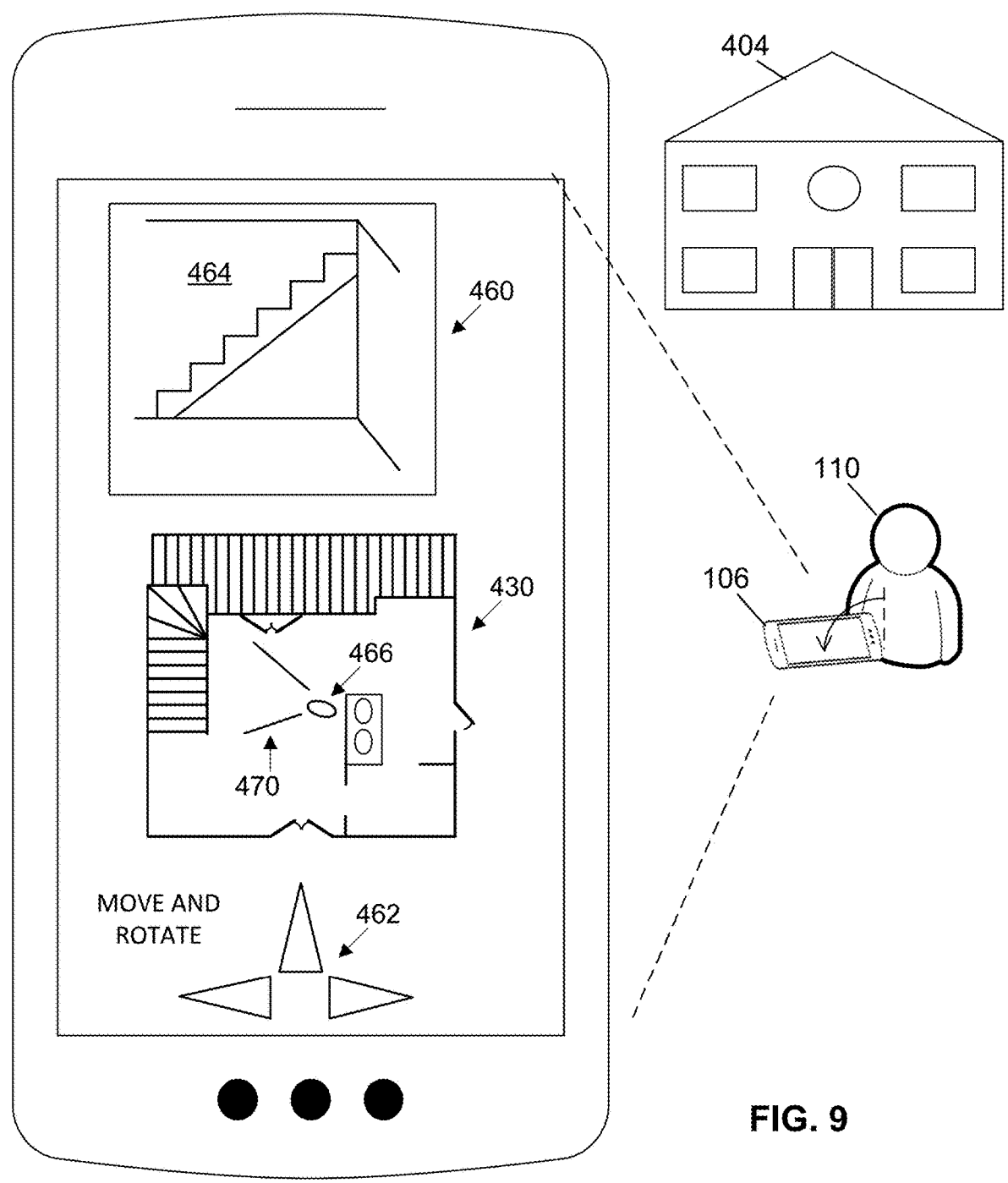

FIG. 9 shows a user device displaying a virtual tour, a corresponding floor plan, and buttons for actuation by a user to control navigation.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, families, couples, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computerexecutable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230. In particular examples, the data 234 includes overlay content for AR presentations relating to accessible items (AIs) for which a timed interchange protocol is scheduled via, at least in part, the AR presentation.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, handheld controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may included wired connections as well.

VR applications immerse the user in a computer-generated environment (FIG. 2B) that simulates reality through the use of the interactive devices. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to the computing device or system 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Connections 276 in FIG. 2A represented interconnectivity between the sensors and/or other interactive devices with a computing device or system 274 by which calculations and other operation are conducted to dynamically produce the changing simulated environment in which user actions such as hand movements, head movements (looking up, down, left, and right), and user-positioning within a safe environment are typically all represented in the simulated environment. The connections 276 may be wired as represented in FIG. 2A and/or may be or include wireless connections as well. The computing device or system 274 may represent any of the user computing device 104, the mobile device 106, the computing system 206 of the enterprise system 200, and/or the external systems 202 and 204 (FIG. 1). A visual VR session is illustrated in FIG. 2B. Audio information may be provided as well, for example via speakers within or mounted on the visor or helmet 262 or other nearby equipment items. A VR session can be used for gaming, viewing information, navigation, and many other uses.

Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 306 includes characters 310 combined with or overlaid in the background scene 304. Any number of artificial characters and/or objects can be included. An AR session can be used for gaming, viewing information, navigation, and many other uses.

FIGS. 4A-9 relate to examples in which an enterprise entity or service entity, for example by use of enterprise system 200, is engaged or involved centrally or peripherally in scheduling a timed interchange protocol via, at least in part, an integrated augmented-reality (AR) presentation. For example, a time interchange protocol, in some embodiments, is a protocol by which renumeration for an item for sale or a lien arrangement therefor is exchanged or used. In some embodiments, an accessible item refers to an item, a parcel, or a service for sale. Such accessible items are referenced herein, in some examples, for brevity, simply AI. Some examples are drawn to accessible items such as real estate properties, and accordingly, in such examples scheduling a timed interchange protocol can entail mortgaging the real estate property.

In some embodiments, an AR presentation is displayed on a user mobile device, for example in the vicinity of a real estate property available for sale. The AR presentation provides various types of displays of various types of information, and guides the use toward acquiring the house by mortgaging the purchase through a financial institution reached, at least in part, through prompts made available during the AR presentation. A user may navigate through outside and inside views of the property, which may be a residential house as a non-limiting example, and then navigate into mortgage application screens to begin and pursue the purchase of the property through services made available by the financial institution. The services made available by the financial institution, in some embodiments, need not be all inclusive with respect to advertising the property, brokering the property, or representing sellers and/or buyers. Thus, embodiments herein can be utilized in conjunction with existing service providers, including seller's agents, buyer's agents, for sale by owner (FSBO) arrangements. The financial institution offering mortgage services according to these descriptions may have formal arrangements, such as partnering, with such other service providers.

The user may be guided to or advised of exemplary accessible items according to, for example, results of a pre-application or pre-approval process by which the use is prescreened with respect to available funds for a down payment, credit rating, income, existing debts or liens, and recurring expenditures according to, for example, car loans, alimony, child support, and other expenses. This advantageously guides the user toward appropriate potential purchases within their financial means, such as homes for purchase at prices within a pre-approved amount. In some examples, user entities have primacy with a financial institution offering mortgage services, referring to the financial institution being primary in handling financial flows and transactional data of the particular user. In such cases, where the user is a highly engaged client, the service entity has direct access to data regarding credit cards, checking, savings, and other financial arrangements and means.

In various embodiments, the system 200 schedules a timed interchange protocol via, at least in part, an integrated augmented-reality (AR) presentation, various stages and examples of which are shown in the drawings. The computing system 206, the at least one of a memory device 222 and a non-transitory storage device 224, and the one or more processor (220,120) implement various examples by which a timed interchange protocol is scheduled. A network connection 258 operatively connects multiple user devices, for example as represented by the user computing device 104 and the user mobile device 106 in FIG. 1, to the computing system 200, each of the multiple user devices having a known or determinable current location. In the example of FIG. 1 two user devices (104, 106) are illustrated and are both associated, in at least some embodiments, with a particular user 110, or user entity where the singly illustrated user 110 in some examples represents a group as described above. FIG. 8 illustrates an example of several user devices being associated each with a respective different user. Thus, multiple user devices can refer to either example.

Upon execution of the computer-readable instructions, the computing system 200 performs steps, for each user device of the multiple user devices, toward scheduling a timed interchange protocol. The steps, in various embodiments, include receiving geolocation data identifying the current location of the user device, for example as determined or known via a positioning device 108 as represented in FIG. 1, and retrieving, from the at least one of a memory device and a non-transitory storage device, overlay content for display on the user device. The overlay content includes information about an accessible item (AI) in a non-transient position proximal to a current location of the user device. The overlay content is sent for display on the user device.

FIG. 4A shows an exemplary AR presentation 402 on a user mobile device 106, which displays an accessible item 404 and overlay content 406, according to at least one embodiment. In the illustrated example, the accessible item 404 is shown as a real estate item, such as a house for sale. The AR presentation 402 can be initiated and/or facilitated by user actions and/or upon the user mobile device 106 detecting or registering with a beacon or a nearby wireless device 410, which may be a Wifi device, a WLAN device, and/or a Bluetooth device as non-limiting examples.

The AR presentation 402 can be initiated and/or facilitated, in at least one example, by the user positioning the house in the center of a frame 412 in the display of the user device 106 as represented in FIG. 4A. Instructive indicia for prompting a scan are included in the display in the illustrated example. In at least one example, the AR presentation 402 can be initiated, accessed and/or facilitated by the user mobile device 106 scanning or interacting with an onsite tag, such as an RFID tag, a QR code or other marker 414 as represented in FIG. 4A. In various examples, a device or sticker applied to a yard sign or a mailbox can provide such a tag or marker. The AR presentation can be navigated manually by user action and/or with full or partial automatic navigation of information about the real estate item 404. The AR presentation displayed on the user mobile device includes images of real world items, such as the accessible item 404, and overlay content 416 including data about the accessible item. In the illustrated example of FIG. 4A, the overlay content 416 includes geometric data such as total indoor area in units of square feet (SQF), renumeration data for acquisition of the accessible item (asking price in USD, see "$"), and a prompt 420 to initiate an acquisition process ("Apply Now").

FIG. 4B shows further data for display on the user device 106, in at least one example, including geometric data such at lot size in acres, renumeration data "$", and a prompt 420 to initiate an acquisition process, according to at least one embodiment. The display of FIG. 4B may be reached by, in at least one example, user navigation from FIG. 4A requesting house information using a corresponding virtual button.

FIG. 4C shows a display window or area presenting results of an affordability analysis. The analysis, in non-limiting examples, may be initiated for example at least in part by user actuation of the "Apply Now" prompts 420 in FIGS. 4A and 4B. FIG. 4D shows a display which may be reached by, in at least one example, user navigation from FIG. 4C requesting to "view full report" information using a corresponding virtual button. The display, in the illustrated example of FIG. 4D, includes a graph of payment and balance data over time Virtual navigation buttons 422 can be used to, for example rotate view of the accessible item 404, for example as represented by transitioning the displayed view from that of FIG. 4A to that of FIG. 5A. The orientation of view of the accessible item 404 can be presented according to positional data identifying the current orientation of the of the user device as represented in FIG. 4A, in which the user mobile device camera view is directed toward the street front side of a house. The orientation of view of the accessible item can be presented according to positional data identifying a current orientation of view preferred by the user according to user actuation of one or more navigational button of the user device, such as in FIG. 5A in which the user has used the rotate-right navigational button 422 to view a right-side image of the house, for example according to a picture file sent from the computing system 200. Data for the additional views of the house such as that of FIG. 5A may be sent for real time access to the user mobile device 106 upon use of navigation buttons. Data for the additional views of the house may be also or alternatively sent to the user mobile device 106 upon initiation of the presentation and stored at least temporarily at the mobile device 106 for access as the user indicates preferred orientations of view by use of navigational buttons, which may be physical or virtual buttons. While the elevation views shown in the drawings include only front views (FIG. 4A) and side views (FIG. 5A), other views may be available for viewing by use of navigational buttons 422.

Plan views are also available in some embodiments. In FIG. 5B, a floor plan view 430 of a first floor of the house is reached from, for example, by navigation from the view of FIG. 5A using the navigational button 432 which prompts transition to the floor plan view.

In some embodiments, the user device displays one or more buttons for actuation by a user to access geometric data and location data about at least a second accessible item (AI), and renumeration data for acquisition of the second AI. In the real estate example of the drawings, the overlay content of FIG. 4A in includes buttons for user by the user to find and access data for other houses for sale, for example which may be in the area or nearby. Where several accessible items (404A, 404B, 404C) are shown in a single view (FIG. 6), a marker 440 is used, in some embodiments to indicate to the user what item corresponds to displayed data. Such functionality facilitates the user in finding, for example, houses having lesser or greater prices than one of current focus, and/or houses of lesser or greater size (square feet "SQF"). FIG. 6 represents transitioning the overlay content data from a lesser priced house 404A to a greater priced 404B house using the intuitive increase (up) key 444 with respect to the price. FIG. 7 represents transitioning the overlay content data from a greater priced 404B house to a lesser priced house 404C, or from a larger house 404B to a smaller house 404C, using the intuitive decrease (down) key with respect to either the price, using 444, or the size according the square feet (SQF), using key 446. In either example of FIG. 7, the marker 440 transitions to the house of focus according the user query, navigation, or focus.

As shown in FIG. 8, orientation of view of an accessible item in a presentation displayed on a user device 106 can be changed by changing the orientation of view of the user device. As already described, a floor plan view 430 such as that of FIG. 5B may be reached, for example, by navigation from the view of FIG. 5A using the navigational button 432 which prompts transition to the floor plan view. In some embodiments, a plan view 430 such as displayed by the user mobile device in FIG. 8 can be accessed by tipping the mobile device 106 from an essentially vertical disposition as in FIG. 4A to a horizontal position as in FIG. 8. In that example, the display can transition from the floor plan of a house of current focus to floor plans of other houses, for example by use of feature navigation buttons 450 exemplified as increasing and decreasing the count of bedrooms, baths, half-baths, and whether a garage is provided or not.

FIG. 8 also represents that the computing system is utilized to provide content including overlay content for AR presentations, geometric data, location data, and renumeration data to multiple user devices being associated each with a respective different user. In the illustrated example, several users are investigating accessible items, illustrated as real estate items for sale, in a common area, such as a neighborhood. Each user device sends its respective geolocation data identifying its current location to the computing system 200, which retrieves and sends respective overlay content for display on each respective user device. Thus the overlay content and other data sent to the user devices are device and/or user specific, in lieu of wide casting of all such data to all nearby user devices for example. Thus, data traffic on network connections is reduced, improving network efficiencies, and reducing latencies and operating costs.

FIG. 9 shows a user device 106 displaying a virtual tour, by which user tours an accessible item, for examples its interior, exterior, or surrounding areas from a user position where such areas may not be currently visible or accessible by natural sight. In the illustrated example, the user 110 navigates in a virtual tour 460 of an interior of a house 404 for sale using a corresponding virtual floor plan display 430 show concurrently with the virtual tour view 460. Virtual buttons 462 are actuated by the user to control navigation within the virtual tour 430, having a three-dimensional perspective image 464 as taken from a position as indicated in the virtual floor plan 430 display by a marker 466 or avatar to confirm to the user the current location from which the image 464 is taken. The virtual floor plan display 430 also includes a field of view indication 470 of the marker or avatar to confirm to the user the current direction of the perspective image 464 of the virtual tour. Thus by use of the virtual navigation buttons 462, the user 110 navigates to any desired position in the virtual tour and directs the field of view to control the three-dimensional perspective image 464. The virtual tour 460 may be freely navigated in some embodiments where sufficient images of the tour area are available, for example, by thorough photography, videography, or three-dimensional computer modeling. The virtual tour 460 may be navigated along predetermined vantage points, in some embodiments, and directed to predetermined orientations, in some embodiments, where, for example, a finite number of images and/or modeled positions and orientations are available.

Presentations described herein as augmented, in some embodiments, are to be displayed on mobile devices such as smart phones. In some embodiments, overlay content sent to a user device may be displayed on laptops and the screens of desktop computers and other computing devices at fixed locations at least tentatively during a presentation or during some stages of an application process for service entity products, such as loan and/or mortgage services by which a user purchases an accessible item such as a real estate item, for example a house and its surrounding plot. Thus, a user may navigate through outside and inside views of a property, and then navigate into mortgage application screens to begin and pursue the purchase of the property through services made available by a financial institution.

These described or implied stages of engagement between the user and the service entity may occur view multiple devices (104, 106) associated with the user 110. For example, the user may visit the location of an accessible item, such as a real estate item having a non-transient position, such as a fixed street address, and be presented overlay content in an AR sessions using a user mobile device, with the current location of the user device being proximal the non-transient position of the accessible item. Further exploration by the same user entity of the particular accessible item, or additional items according to user queries as in FIGS. 6-7, may occur using one or more other devices associate with the same user entity. Virtual tours, for example, and viewing floor plans, may be conducted using any type of user device, such as a laptop or personal computer, that is home-based or is otherwise not collocated with the user mobile or is not proximal the accessible item. Navigating among mortgage application screens and completing virtual forms, for example, may also be conducted among one or more other user devices according to the convenience of the user entity. Thus, while the drawings generally represent the user device 106 and hand held, and mobile, these descriptions refer as well to other types of user devices having computing and display capabilities.

FIG. 4A represents a user accessing promotional first information as overlay content in an AR presentation via a mobile device 106, and may thereby advance into an awareness stage with respect to the accessible item 404 and services made available by a service entity, such as a banking institution. The user entity 110 may subsequently or pre-emptively access other information via the computing device 104 (FIG. 1). The user can utilize any owned or accessible devices, and may prefer a laptop or other personal computer in lieu of a mobile phone when browsing detailed information and when completing an application for service, such as a loan application for a mortgage loan. These descriptions embrace that flexibility and/or user choice by use of such terms as one or more device of each user entity or associated with a user entity. In at least one example of an implementation of features described herein, the user entity is an audience of information provided by a lender in an interaction progress, and the user devices are the targets for digital promotional content, files, and inquiries for further data by which a mortgage application process is implemented. In that sense, information can be described as sent or intended for the user entity or user device, without necessitating one device of the user over another. The enterprise entity inferred and/or represented by the enterprise system 200 may disseminate promotional information and engagement progress forms and interrogatories regarding services to each or any of multiple user devices.

For each user entity that accesses any promotional first information item, such as overlay content represented or reached by any virtual buttons in the drawings, of which the "Apply Now" button in FIG. 4A is a non-limiting example, an indicative signal reaches the lender. Thus the lender in this example receives a signal indicating that at least the particular user entity 110 has accessed disseminated promotional information. Thus the lender receives an indication that the user entity has clicked or wishes to receive a digital advertisement, or for example has begun navigating into mortgage related content in the lender's website or portal. The progress of the user entity 110 can be recorded by the lender by storing staged records thereby recording at least that the user entity 110 has accessed various contents and/or has provided application information by completing in whole or in part various application stage forms or fields. User actions can be organized into sequential categories, with reference to completions stages for a mortgage application process, progressing into deepening interaction or engagement with the lender.

An online calculator or other tool may be provided by the lender for use by the user entity to determine mortgage rates, amortized payments, pay-off amounts, and other quantities and metrics. In the illustrated example, the user entity applies for, and acquires a mortgage loan. Thus a thorough application process is represented by a few exemplary illustrations with reference to the drawings. Through overlay content and application stage fields and interrogatories for completion by the user entity utilizing any number of user devices, the user entity 110 is encouraged and guided to complete an application process and advance toward conversion.

Progress along an acquisition process, such as a mortgage and/or other loan or financial service, permits narrowing of target audiences for disseminated content, from wide user groups for basic disseminated information such as brand awareness advertising and basic introductions to the range of products and services a provider may offer, to smaller targeted groups. Thus, according to systems and methods described herein, interactions between a provider and existing or potential clients can be increasingly personalized. From a wider public perspective, the narrowing nature of deepening engagement interactions into staged categories reduces data trafficked across networks, conserving network resource to improve communication networks and systems efficiencies, to minimize latencies and needless redundancies, to reduce costs, and to lower energy consumption.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for scheduling a timed interchange protocol via, at least in part, an integrated augmented-reality (AR) presentation, the system comprising:
   a computing system comprising:
      one or more processors,
      at least one of a memory device and a non-transitory storage device storing computer-readable instructions, and
      a network connection for operatively connecting multiple user devices to the computing system, wherein each of the multiple user devices have a known or determinable current location;
   wherein, upon execution of the computer-readable instructions, the computing system is configured to:
      receive geolocation data identifying the current location of a user device of the multiple user devices;
      retrieve, from at least one of the memory device and the non-transitory storage device, overlay content for display on the user device, wherein the overlay content comprises:
         information on a real-world accessible item (AI) in a non-transient position proximal to the current location of the user device, and
         personalized acquisition data associated with a financial institution for a user of the user device to acquire the real-world AI based on the information on the real-world AI and one or more financial characteristics of the user determined from an account of the user associated with the financial institution; and
      transmit the overlay content for display on the user device.

2. The system of claim 1, wherein the user device is configured to display the overlay content in an AR presentation.

3. The system of claim 2, wherein, upon execution of the computer-readable instructions, the computing system is further configured to:
   receive positional data identifying at least one of:
      a current orientation view of the real-world AI from the perspective of the user device, and
      a preferred orientation view of the real-world AI according to the user interacting with one or more navigational buttons; and
   transmit updated overlay content for display on the user device, wherein the updated overlay content comprises at least one of:
      content retrieved from at least one of the memory device and the non-transitory storage device, and
      content generated based on data retrieved from at least one of the memory device and the non-transitory storage device,
   wherein the user device is configured to display the updated overlay content in an updated AR presentation.

4. The system of claim 1, wherein the overlay content comprises geometric data about the real-world AI, personalized remuneration data for the user for acquisition of the real-world AI indicating whether the financial institution approved the user for the acquisition of the real-world AI based on the personalized acquisition data, and a prompt to initiate an acquisition process.

5. The system of claim 4, wherein the acquisition process comprises scheduling a timed interchange protocol.

6. The system of claim 5, wherein the real-world AI comprises a real estate property, and wherein scheduling the timed interchange protocol comprises mortgaging the real estate property.

7. The system of claim 6, wherein the user device comprises a mobile device, and wherein a user of the user device is provided at least a partial tour of the real estate property via the AR presentation on the mobile device by the user interacting with one or more navigational buttons associated with the user device, wherein the AR presentation comprises display of real-world items and the overlay content.

8. The system of claim 1, wherein the user device displays one or more digital buttons for actuation by a user to access geometric data, location data about at least a second real-world accessible item (AI), and remuneration data for acquisition of the second real-world AI.

9. A system for scheduling a timed interchange protocol via, at least in part, an integrated augmented-reality (AR) presentation, the system comprising:
   a computing system comprising:
      one or more processors,
      at least one of a memory device and a non-transitory storage device storing computer-readable instructions, and
      a network connection for operatively connecting, to the computing system, multiple user devices all associated with a particular user, the multiple user devices comprising a user mobile device having a GPS determinable current location, and a user computing device;
   wherein, upon execution of the computer-readable instructions, the computing system is configured to:
      retrieve geolocation data identifying the current location of the user mobile device;
      retrieve, from at least one of the memory device and the non-transitory storage device, overlay content for display on the user mobile device, wherein the overlay content comprises:
         information on a real-world accessible item (AI) in a non-transient position proximal to the current location of the user device, and
         personalized acquisition data associated with a financial institution for a user of the user device to acquire the real-world AI based on the information on the real-world AI and one or more financial characteristics of the user determined from an account of the user associated with the financial institution;
      transmit the overlay content for display on the user mobile device thereby causing the user device to display the overlay content in an AR presentation; and
      transmit, to at least one of the user mobile device and the user computing device, a prompt to initiate an acquisition process.

10. The system of claim 9, wherein, upon execution of the computer-readable instructions, the computing system is further configured to:

receive positional data identifying at least one of:
  a current orientation view of the real-world AI from the perspective of the user mobile device, and
  a preferred orientation view of the real-world AI according to the user interacting with one or more navigational buttons; and
transmit updated overlay content for display on the user mobile device, wherein the updated overlay content comprises at least one of:
  content retrieved from at least one of the memory device and the non-transitory storage device; and
  content generated based on data retrieved from at least one of the memory device and the non-transitory storage device,
wherein the user mobile device is configured to display the updated overlay content in an updated AR presentation.

11. The system of claim 9, wherein the overlay content comprises geometric data about the real-world AI, personalized remuneration data for the user for acquisition of the real-world AI indicating whether the financial institution approved the user for the acquisition of the real-world AI based on the personalized acquisition data, and a prompt to initiate an acquisition process.

12. The system of claim 11, wherein:
the acquisition process comprises scheduling a timed interchange protocol;
the real-world AI comprises a real estate property; and
scheduling the timed interchange protocol comprises mortgaging the real estate property.

13. The system of claim 12, wherein a user of the user mobile device is provided at least a partial tour of the real estate property via the AR presentation on the mobile device by the user interacting with one or more navigational buttons associated with the mobile device, wherein the AR presentation comprises display of real-world items and the overlay content.

14. The system of claim 9, wherein the user device displays one or more digital buttons for actuation by a user to access geometric data, location data about at least a second real-world accessible item (AI), and remuneration data for acquisition of the second real-world AI.

15. A method for scheduling, by a computing system, a timed interchange protocol via at least in part an integrated augmented-reality (AR) presentation, the computing system comprising one or more processor, at least one of a memory device and a non-transitory storage device, and a network connection for operatively connecting multiple user devices to the computing system, the method comprising:
receiving geolocation data identifying a current location of a user device;
retrieving, from at least one of the memory device and the non-transitory storage device, overlay content for display on the user device, wherein the overlay content comprises:
  information on a real-world accessible item (AI) in a non-transient position proximal to the current location of the user device, and
  personalized acquisition data associated with a financial institution for a user of the user device to acquire the real-world AI based on the information on the real-world AI and one or more financial characteristics of the user determined from an account of the user associated with the financial institution; and
transmitting the overlay content for display on the user device.

16. The method of claim 15, wherein transmitting the overlay content for display on the user device causes the user device to display the overlay content in an AR presentation.

17. The method of claim 16, further comprising:
receiving positional data identifying at least one of:
  a current orientation view of the real-world AI from the perspective of the user device, and
  a preferred orientation view of the real-world AI according to the user interacting with one or more navigational buttons; and
transmitting updated overlay content for display on the user device, wherein the updated overlay content comprises at least one of:
  content retrieved from at least one of the memory device and the non-transitory storage device; and
  content generated based on data retrieved from the at least one of the memory device and the non-transitory storage device,
wherein sending the updated overlay content for display on the user device causes the user device to display the updated overlay content in an updated AR presentation.

18. The method of claim 15, wherein the overlay content comprises geometric data about the real-world AI, personalized remuneration data for the user for acquisition of the real-world AI indicating whether the financial institution approved the user for the acquisition of the real-world AI based on the personalized acquisition data, and a prompt to initiate an acquisition process.

19. The method of claim 18, wherein:
the acquisition process comprises scheduling a timed interchange protocol;
the real-world AI comprises a real estate property; and
scheduling the timed interchange protocol comprises mortgaging the real estate property.

20. The method of claim 15, wherein the user device displays one or more digital buttons for actuation by a user to access geometric data, location data about at least a second real-world accessible item (AI), and remuneration data for acquisition of the second real-world AI.

* * * * *